Feb. 7, 1933.  A. O. WILLIAMS  1,896,386
CONVEYER
Filed Sept. 23, 1930  4 Sheets-Sheet 1
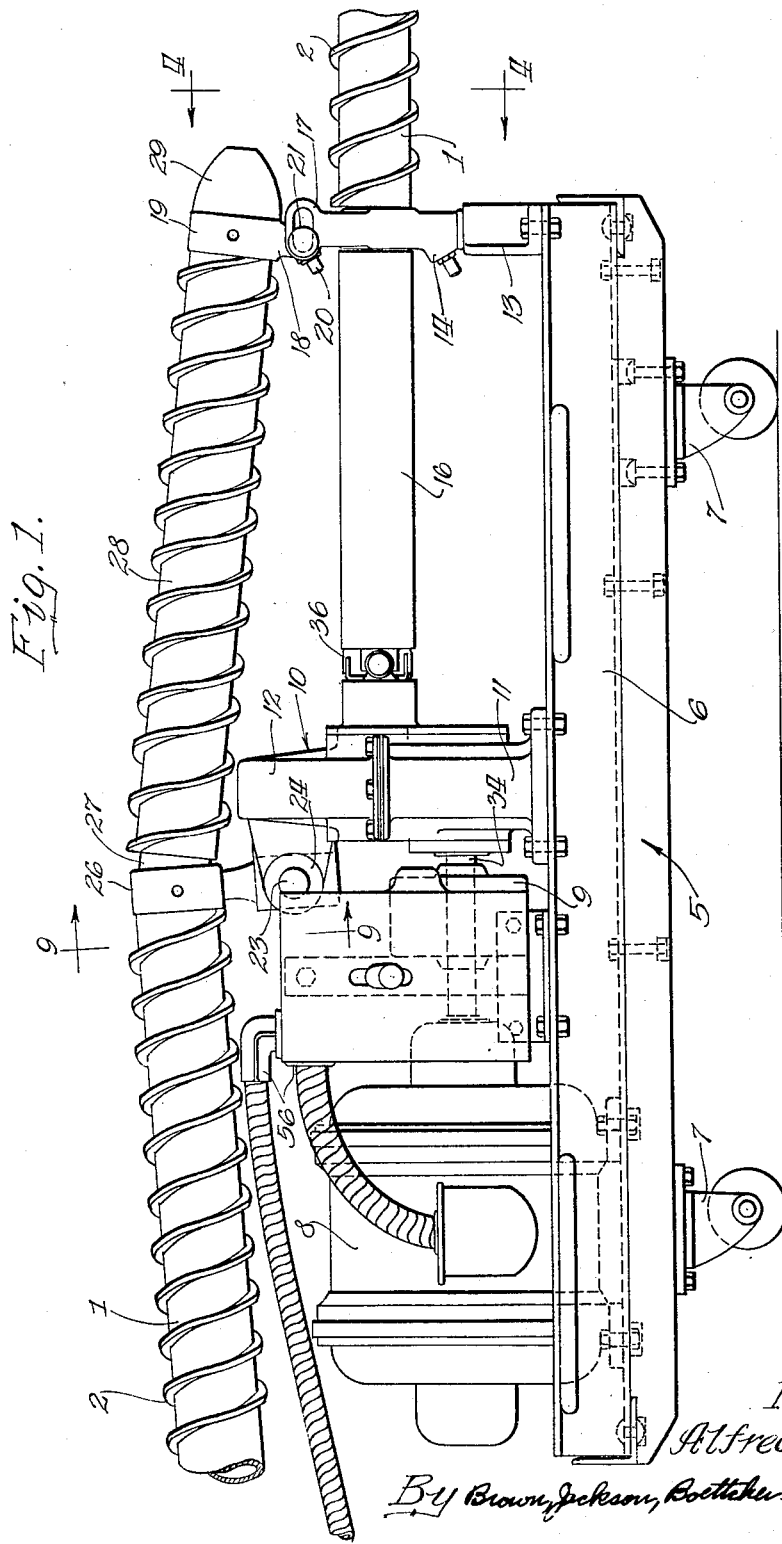

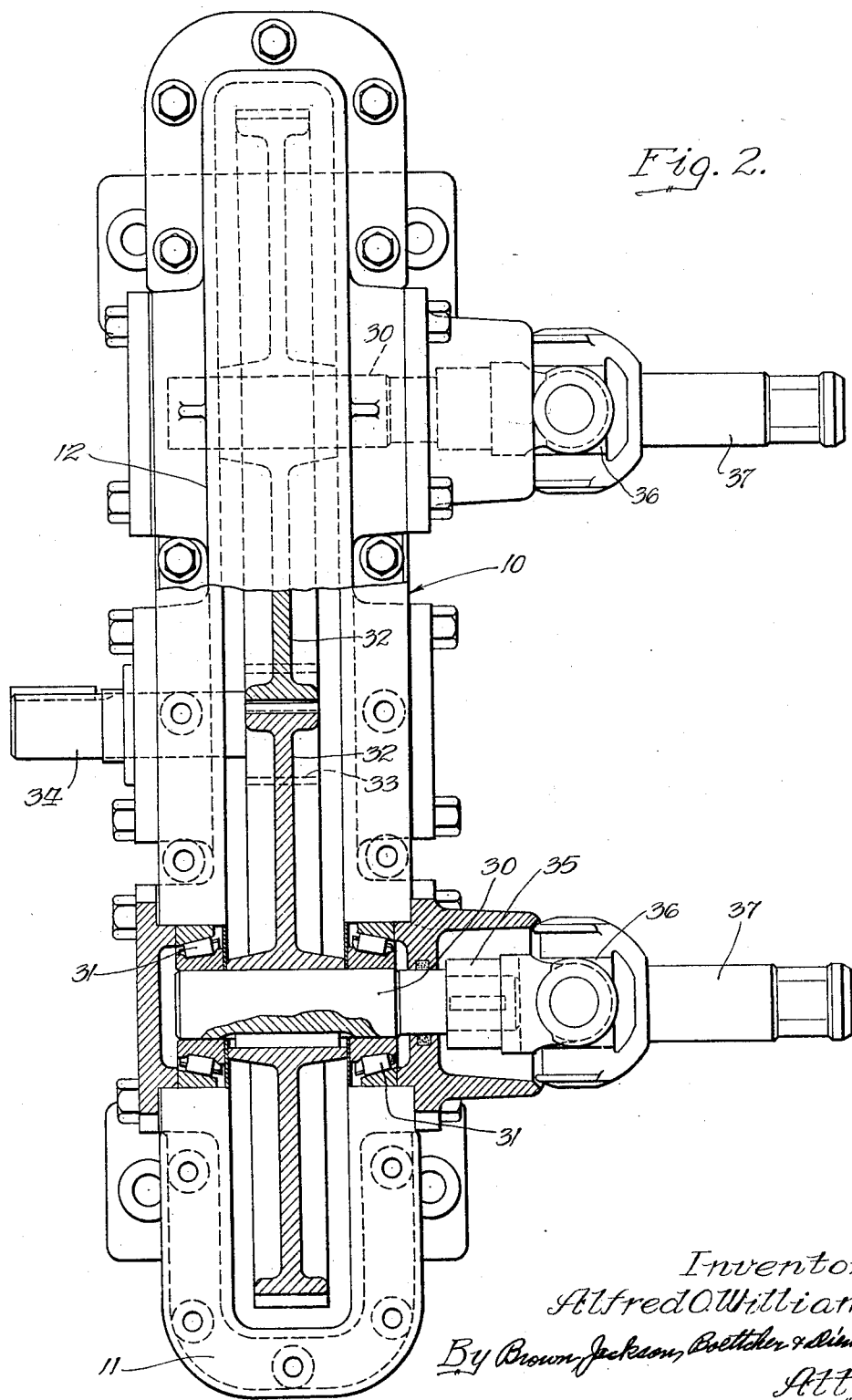

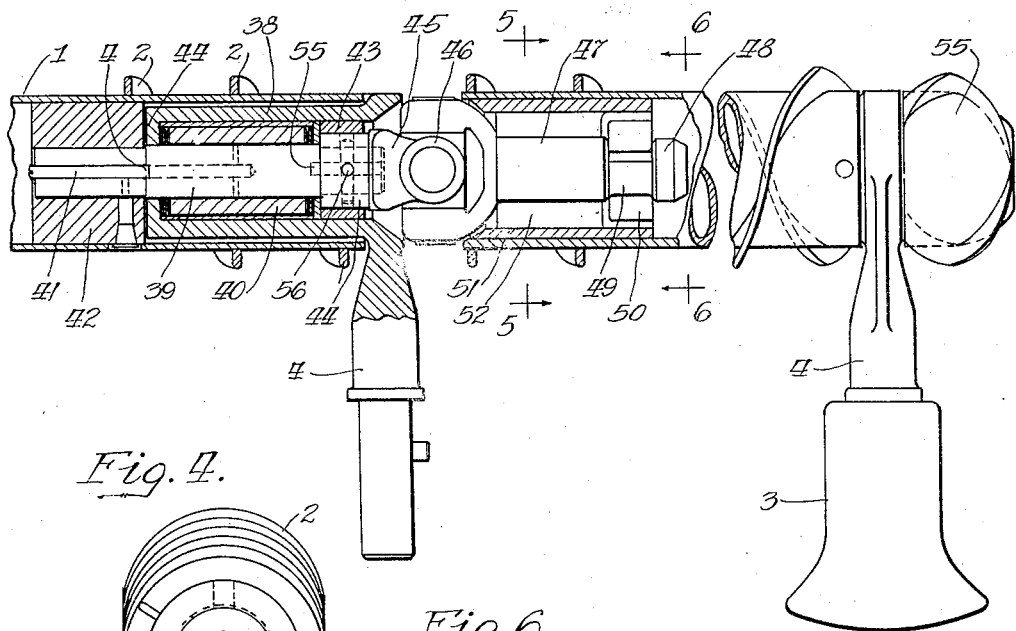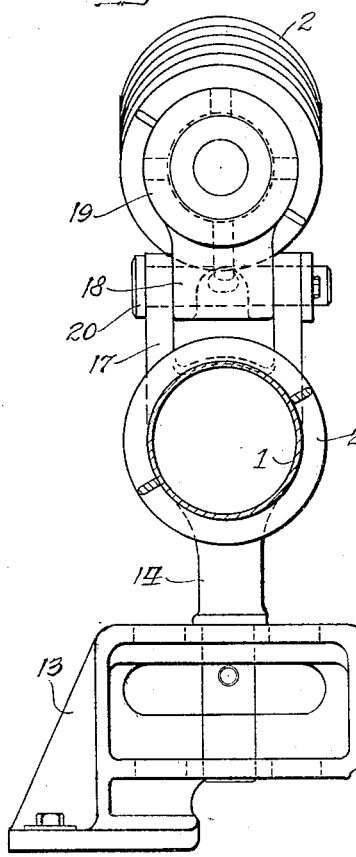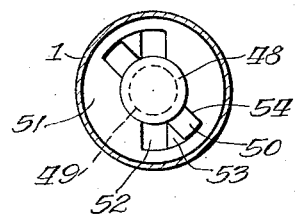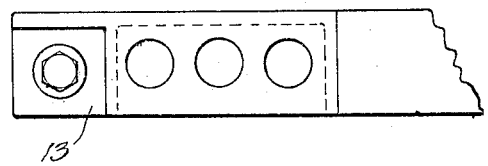

Feb. 7, 1933. A. O. WILLIAMS 1,896,386
CONVEYER
Filed Sept. 26, 1930 4 Sheets-Sheet 4
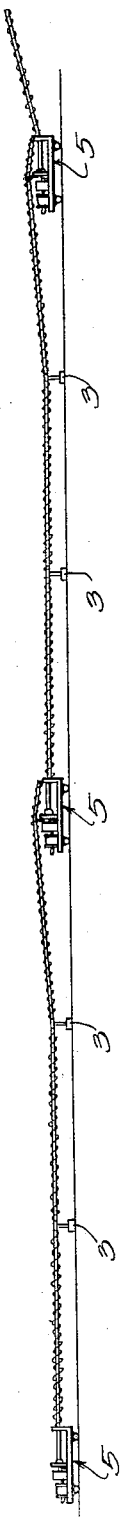
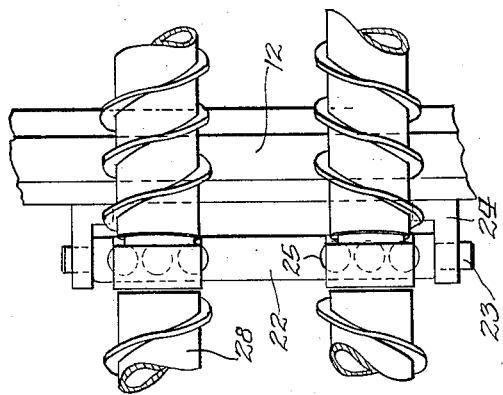
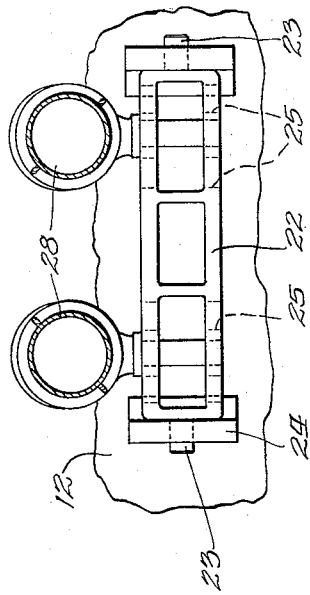
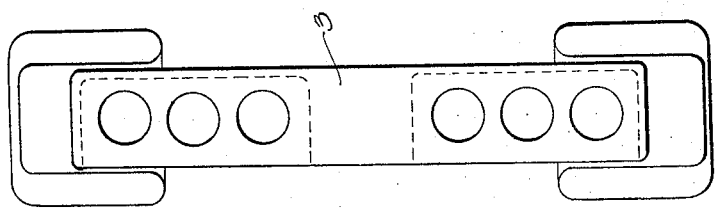

Patented Feb. 7, 1933

1,896,386

UNITED STATES PATENT OFFICE

ALFRED O. WILLIAMS, OF BATTLE CREEK, MICHIGAN, ASSIGNOR TO CLARK TRUC-TRACTOR COMPANY, OF BUCHANAN, MICHIGAN, A CORPORATION OF MICHIGAN

CONVEYER

Application filed September 26, 1930. Serial No. 484,546.

This invention relates to conveying means, and more particularly to a conveyer system comprising a plurality of sections which are adapted to be assembled quickly and with facility.

In the patent to John J. Armstrong and Robert S. Woodford, issued December 8, 1925, No. 1,564,926, there is disclosed a screw conveyer comprising threaded shafts for propelling therealong articles upon such shafts during rotation thereof, and a driving unit for rotating the shafts in opposite relation. This conveyer is portable so as to be moved readily from one scene of operation to another. In order that a conveyer of this type may be portable and practicable, the power or driving unit must be kept within reasonable limits as to size and weight. The propeller shafts are formed in sections having interlocking means for connecting the same, so that the conveyer can readily be assembled and disassembled. Since the driving unit is limited by considerations of portability, the total length of the conveyer is of necessity limited to such length of the shafts as can be driven satisfactorily by the driving unit. Under ordinary conditions, a conveyer of this type is limited, by considerations of portability and the power of the driving unit, to a length of approximately fifty feet. I find that, in practice, it is frequently desirable to transport articles, by means of conveyers of this type, to distances of 500 or 1,000 feet, or even greater.

One of the main objects of my invention is to provide a conveyer system comprising a plurality of conveyer sections similar to that above referred to, each of such sections having associated therewith an individual driving unit, the sections of the system being so related that each section bridges the driving unit of the next succeeding section. A further object is to provide a driving unit for each of the conveyer sections, this driving unit having associated therewith means for supporting members constituting extensions of the shafts of the next preceding conveyer section, such extension members being so supported as to deliver articles from the preceding section to the conveyer section driven by such driving unit. Further objects and advantages of my invention will appear from the detailed description.

In the drawings:

Figure 1 is a side view of a driving unit and associated parts of a conveyer system in accordance with my invention;

Figure 2 is a plan view of the transmission of the driving unit, partly broken away and in section;

Figure 3 is a vertical sectional view taken lengthwise through the adjacent ends of two adjacent lengths of one of the conveyer shafts and associated parts, partly shown in elevation, this view also showing the discharge end of one of the shafts and associated parts in elevation;

Figure 4 is a view taken substantially on line 4—4 of Figure 1;

Figure 5 is a section taken substantially on line 5—5 of Figure 3;

Figure 6 is a section taken substantially on line 6—6 of Figure 3;

Figure 7 is a semi-diagrammatic side view of a conveyer system in accordance with my invention;

Figure 8 is a plan view of the block which carries the driving unit supports for the shafts of the upper conveyer section, and associated parts;

Figure 9 is a front view of the block of Figure 8;

Figure 10 is a plan view of the stand for the driving unit supports of the connecting members; and Figure 11 is a plan view of one of the stands for the conveyer shafts supports.

I have illustrated my invention, by way of example, as applied to a conveyer system comprising a plurality of conveyer sections similar to the conveyer disclosed in the patent to John J. Armstrong and Robert S. Woodford, above identified, to which it is particularly adapted. Each of the conveyer sections of the system comprises shafts 1 provided with suitably disposed thread elements 2, and suitable means for rotating these shafts in proper relation for propelling articles placed thereon along the shafts by the action of the threads. Each shaft 1 is conveniently formed from a plurality of sections detachably secured together for driving connection in a suitable manner. For supporting the shafts 1 intermediate the ends thereof, I provide suitably disposed stands 3 (Figure 7) having associated therewith supports 4 conveniently disposed at one end of selected shaft sections, such supports rotatably supporting the ends of such sections. Preferably, I provide a support at the discharge or delivery end of each shaft section, and the sections of these shafts are connected together by universal joints so that the angular relation between the shaft sections can be varied within limits for transporting or conveying articles through other than a straight path.

A power unit 5 is provided at the receiving end of each of the conveyer sections. This unit includes a base 6 suitably mounted upon casters 7, or in any other suitable manner, so as to be transported with facility. An electric motor 8, of suitable type and power, is mounted upon base 6 adjacent one end thereof. This motor has driving connections, preferably through a yielding coupling 9 of known type, with a transmission 10. This transmission is enclosed within a suitable housing or casing comprising a lower section 11 suitably secured to base 6, and an upper section 12 suitably secured, as by bolting, to the lower section. At the other side of the transmission, and adjacent the other end of base 6, a stand 13 is secured to the base. This stand receives supporting members 14 provided with reduced shanks which fit into openings in stand 13. As will be noted more clearly from Figure 10, stand 13 is provided, adjacent each side thereof, with a series of openings whereby the distance between the supports 14 may be adjusted by insertion of these supports into the proper openings of the stand. The supports 14 rotatably support the outer ends of tubular connecting members 16 which are driven by the transmission 10. Supports 14 are provided with upwardly extending elements 17 which receive between them lugs 18 depending from extension supports 19. The lug 18 is suitably bored for reception of the pin 20, this pin also passing through slots 21 in elements 17 and extending lengthwise of the connecting members 16.

A supporting block 22 is rockably mounted, by means of end gudgeons 23, in brackets 24 bolted or otherwise suitably secured to the upper section 12 of the transmission casing. This block is provided, at each end thereof, with a series of spaced openings 25 adapted for reception of the reduced shanks of supporting members 26 which extend upwardly above transmission 10 and motor 8. Openings 25 provide convenient means for adjusting the supporting members 26 toward and away from each other.

Members 26 rotatably support the adjacent ends of shafts 1 of the conveyer section immediately preceding the driving unit 5. Shafts 1 are connected by universal joints 27 to extension members 28 which are rotatably mounted in the extension supports 19. Preferably, a rounded terminal member or knob 29 is secured in the discharge or delivery end of each of the extension members 28. Connecting members 16 are suitably connected to shafts 1 of the succeeding conveyer section driven by the unit 5, these shafts being disposed to receive articles delivered thereto from extension members 28. The extension members 28 and the conveyer shafts 1 associated therewith extend above and bridge the driving unit so that, in this respect, the conveyer section preceding this unit may be termed an upper section, the conveyer section driven by this unit being a lower section to which articles are delivered from the upper section.

A conveyer constructed in accordance with my invention, above set forth, comprises a plurality of conveyer sections, each section having associated therewith an individual driving unit which is independent of the other sections and possesses the proper power for driving the conveyer section at desired speeds. The conveyer sections and associated units for driving the same, can be assembled quickly and with facility. Since each conveyer section is provided with its individual driving unit, any desired number of sections may be utilized and a conveyer system of any desired length can be quickly assembled and put into operation. This is particularly valuable where it is necessary to convey articles at distances of several hundred feet or more, such as is frequently the case in storing articles in warehouses, loading and unloading ships, and in many other instances.

Referring more particularly to Figure 2, two stub shafts 30 are rotatably supported in the transmission casing, preferably by means of roller bearings 31. Spur gears 32 are keyed on these stub shafts and are disposed in intermeshing relation. One of these spur gears is driven by a pinion 33 in mesh therewith, this pinion being keyed on a stub shaft 34 rotatably mounted in the transmission casing and driven from motor 8 through coupling 9. A member 35 is keyed upon the outer end of each stub shaft and is connected, by a universal joint 36 of known type, to a member 37 which is inserted into connecting member 16 and has driving connection therewith. The means for connecting the ends of adjacent lengths of the conveyer shafts together, and the means for connecting the extension members 28 and the connecting members 16 to the conveyer shafts and to the stub shafts of the transmission, is the same in each instance so that a description of one of such means will suffice.

Referring more particularly to Figures 3, supporting member 4 is provided with a sleeve 38 which extends into the adjacent end of the preceding shaft length. A stub shaft 39 is rotatably mounted through sleeve 38, preferably by means of roller bearings 40. This shaft projects inwardly beyond the sleeve an appreciable distance and is provided, at such projecting portion, with a rib 41 which fits into a slot in a collar 42 having an axial bore which receives the shaft, this collar being spot-welded or otherwise suitably secured to the conveyer shaft 1. A bushing 43 is suitably secured in sleeve 38, adjacent the outer end thereof and cooperates with an inwardly extending flange 44 at the inner end of the sleeve, for confining the bearing structure 40. This bushing slidably and rotatably receives a collar 44 of a connecting element 45, this element being connected by a universal joint 46, of known type, to a stub shaft 47. This shaft 47 is provided, at the inner end thereof, with a head 48 connected to the shaft by a reduced neck 49 which is provided with diametrically opposite and radially projecting lugs 50. Shaft 47 is insertible through a sleeve 51 which is spot-welded or otherwise suitably secured in the adjacent end of the succeeding conveyer shaft length, this sleeve having slots 52 therein to accommodate lugs 50. Sleeve 51 is provided, in the inner end thereof, with arcuate cutouts or recesses 53 extending from the slots 52 and concentric with the sleeve. These recesses provide, at the ends thereof remote from slots 52, shoulders 54 with which the lugs 50 contact for establishing driving connection between stub shaft 47 and the associated length of the conveyer shaft. In attaching stub shaft 47 to the conveyer shaft, it is inserted through sleeve 51 with the lugs 50 in slots 52. When the lugs pass beyond the inner ends of the slots, the stub shaft may be turned slightly so as to bring the lugs 50 into contact with shoulders 54. When thus disposed, the lugs prevent withdrawal of the stub shaft from the sleeve and also establish driving connection between these members. Shaft 39 is provided, in its outer end portion, with a diametrical slot 55 which receives a pin 56 secured through collar 44 diametrically thereof. This provides simple and efficient means for establishing driving connection between collar 44 and shaft 39, which shaft is driven from the associated length of the conveyer shaft through collar 42. The conveyer shaft length is rotatably supported by the roller bearing 40, at one end, and at its other end this shaft length is universally connected by means of a stub shaft 47 and associated parts to a preceding conveyer shaft length, or to one of the connecting members 16, as the case may be.

The members 37 for connecting the stub shafts of the transmission to the connecting members 16 correspond to the stub shafts 47 of Figure 3 and are connected to the members 16 in the same manner as stub shafts 47 are connected to the associated lengths of the conveyer shaft. The supports 14, 19 and 26 and the bearings and associated connecting members and universal joints, are similar in all essential respects to those illustrated in Figure 3 and need not be illustrated nor described in detail. Preferably, the shaft lengths and associated elements of the conveyer shaft are connected in the manner illustrated in Figure 3, though this particular connecting means is not essential in all instances and other suitable means for connecting such members may be employed, it being sufficient to note that the lengths of the conveyer sections and the extension members 28 and the connecting members 16 are connected together in a suitable manner to establish detachable driving connections therebetween.

The universal connections between the various elements of the conveyer sections are advantageous as permitting of adjustment of the length of the conveyer section as conditions may require. The distance between the shafts of each of the conveyer sections may be varied to suit conditions, and the universal connections between the connecting members 16 and the transmission and the conveyer shaft are advantageous as permitting of this adjustment. This applies equally to the universal connections between the extension members 28 and the associated conveyer shaft. In this connection, the rockable mounting of the block 22 and the pin and slot connection between the members 17 and 19 are advantageous as accommodating variation in the inclination of the conveyer shaft length extending above the motor 8, and permitting of slight endwise movement of the extension member 28 to accommodate such variation.

Preferably I provide a threaded terminal element 55 at the discharge or delivery end of each shaft of the last conveyer section of the system. This terminal member may be connected to a shaft rotatably mounted in a sleeve of the supporting member 4 in the same manner as member 45 is connected to shaft 39, or in any other suitable manner. Likewise, member 29 may be similarly connected to a shaft corresponding to shaft 39 and rotatably mounted in a sleeve of extension support 19. The motor 8 is controlled by a switch disposed in a switch box 56 suitably mounted upon the supporting unit adjacent the motor.

What I claim is:

1. In a conveyer system, a plurality of conveyer sections including rotatably mounted shafts having threads thereon for propelling articles along the shafts upon rotation thereof, independent driving units for the shafts of the individual sections, means for rotatably supporting the shafts of each section upon and above the driving unit of the next succeeding section, and extension members rotatably supported upon and above each of the driving units and connected to the shafts of the next preceding conveyer section, said extension members delivering to the next succeeding conveyer section.

2. In a conveyer system, a lower conveyer section comprising rotatably mounted shafts provided with threads disposed to propel articles thereon along the shafts upon rotation thereof, a driving unit having driving connections with the shafts, an upper conveyer section similar to the lower section, means rotatably supporting the delivery ends of the shafts of the upper section upon and above said unit, and extension members supported upon and above the unit and connected to the shafts of the upper section for rotation therewith, said extension members being disposed to deliver to the lower conveyer section.

3. In a conveyer system, a lower conveyer section comprising rotatably mounted shafts provided with threads disposed to propel articles thereon along the shafts upon rotation thereof, a driving unit having driving connections with the shafts, an upper conveyer section similar to the lower section, means rotatably supporting the delivery ends of the shafts of the upper section upon and above said unit, said means being rockable on an axis extending transversely of the upper section, extension members having universal connections at one end to the delivery ends of the shafts of the upper conveyer section, and means for rotatably supporting the extension members, adjacent the other ends thereof, upon and above the driving unit, the extension member supporting means being rockable on an axis extending transversely of said members, the extension members being disposed to deliver to the lower conveyer section.

4. In a conveyer system, a lower conveyer section comprising rotatably mounted shafts provided with elements disposed to propel articles thereon along the shafts upon rotation thereof, a driving unit having driving connections with the shafts, an upper conveyer section similar to the lower section, means for rotatably supporting the shafts of the lower section upon the driving unit, means rotatably supporting the shafts of the upper section upon and above the driving unit, extension members having universal connections with the shafts of the upper section and extending toward and above the shafts of the lower section, and means carried by said supporting means and rotatably supporting the extension members.

5. In a conveyer system, a driving unit including a motor and a transmission driven thereby, said transmission having an enclosing casing, a lower conveyer section comprising shafts provided with elements disposed to propel articles thereon along the shafts upon rotation thereof, supporting members mounted on the unit at the opposite side of the transmission from the motor, connecting members driven from the transmission and rotatably mounted in said supporting members, driving connections between said shafts and the connecting members, an upper conveyer section comprising shafts provided with elements disposed to propel articles thereon along the shafts upon rotation thereof, supporting members mounted upon the transmission casing and rotatably supporting the shafts of the upper section, extension members connected to the ends of the upper shafts and driven thereby, and supporting members mounted upon the supporting members for the connecting members and rotatably supporting said extension members.

6. In a conveyer system, a driving unit including a transmission and a motor at one side of the transmission and supporting members at the other side of the transmission, the transmission being driven from the motor and having an enclosing casing, connecting members driven by the transmission and rotatably supported by the supporting members, a lower conveyer section comprising shafts connected to the outer ends of the connecting members and driven thereby, supporting members mounted upon the transmission casing, an upper conveyer section comprising shafts rotatably supported by the supporting members upon the transmission casing, extension supporting members mounted upon and extending upwardly from the supporting members for the connecting members, and extension members rotatably mounted in said extension supporting members and connected to and driven by the shafts of the upper conveyer section.

7. In a conveyer system, a driving unit including a transmission and a motor at one side of the transmission and supporting members at the other side of the transmission, the transmission being driven from the motor and having an enclosing casing, stub shafts driven by the transmission, connecting members rotatably supported by the supporting members, said supporting members being adjustable toward and away from each other, universal connections between the stub shafts and the inner ends of the connecting members, a lower conveyer section comprising shafts having universal connection to the outer ends of the connecting members, extension supporting members mounted upon and extending upwardly from the supporting members for the connecting members, supporting members mounted upon and extending above the transmission casing and adjustable toward and away from each other, an upper conveyer section comprising shafts rotatably supported by the last mentioned supporting members, and extension members rotatably supported by said extension supporting members and universally connected to and driven by the shafts of said upper section.

8. In a conveying system, a driving unit including a transmission and a motor at one side of the transmission and having driving connection therewith, a stand at the other side of the transmission, said transmission having an enclosing casing, supporting members mounted on the stand, extension supports extending upwardly from said members and having pin and slot connection therewith, connecting members driven by the transmission and rotatably supported by said supporting members, a lower conveyer section comprising shafts connected to and driven by said connecting members, a block supported on the transmission casing for rocking movement on a horizontal axis, supporting members mounted on the block and extending above said casing, an upper conveyer section comprising shafts rotatably supported by the supporting members of the block and extending above the motor, and extension members rotatably supported by said extension supports and having universal connection to the shafts of the upper conveyer section.

9. In a driving unit adapted for use with an upper section and a lower section of a conveyer system, said sections comprising rotatably mounted shafts, a transmission, a motor at one side of the transmission and having driving connection therewith, connecting members extending from the other side of the transmission and driven thereby, means for rotatably supporting said members, supporting members extending above the transmission and above the motor and adapted to rotatably support the shafts of the upper section, and extension supports mounted upon and extending above said supporting means, said supports being adapted to rotatably support members forming extensions of the shafts of said upper section, the connecting members being adapted for connection to the shafts of the lower conveyer section.

10. In a driving unit of the character described, a transmission having an enclosing casing, a motor at one side of and having driving connection with the transmission, a stand at the other side of and remote from said transmission, supporting members extending upward from the stand and having upwardly extending projections, connecting members driven by the transmission and rotatably supported by the supporting members, conveyer sections mounted on the supporting members and having driving connections with said connecting members, a block mounted on the transmission casing, and supporting members extending upward from the block and extending above the motor and the transmission.

11. In a driving unit of the character described, a transmission, a motor at one side of and having driving connection with the transmission, supporting members at the other side of and remote from the transmission, connecting members driven by the transmission and rotatably supported by said supporting members, conveyer sections mounted on the supporting members and having driving connections with the connecting members, the supporting members being adapted for reception of upper supporting members mounted thereon, and supporting members adjacent the transmission and extending above said transmission and the motor.

12. In a driving unit of the character described, a motor, a transmission driven thereby, supporting members remote from the transmission and adapted for reception of upper supporting members mounted thereon, connecting members driven by the transmission and rotatably supported by said supporting members, conveyer sections mounted on the supporting members and having driving connections with the connecting members, and supporting members adjacent the transmission and extending above said transmission and the motor.

In witness whereof, I hereunto subscribe my name this 23 day of Sept., 1930.

ALFRED O. WILLIAMS.